United States Patent Office 3,260,653
Patented July 12, 1966

3,260,653
PROCESS FOR THE PRODUCTION OF 6-AMINO-
PENICILLANIC ACID
Wilfried Kaufmann and Klaus Bauer, Wuppertal-Elberfeld, Germany, assignors to Farbenfabriken Bayer Aktiengesellschaft, Leverkusen, Germany, a corporation of Germany
No Drawing. Filed Apr. 14, 1960, Ser. No. 22,086
Claims priority, application Germany, Apr. 18, 1959,
F 28,260
5 Claims. (Cl. 195—36)

This invention relates in general to novel chemical processes. In particular, the invention involves the provision of a unique biochemical process for the production of 6-aminopenicillanic acid.

The compound 6-aminopenicillanic acid forms a valuable starting material for the syntheses of new penicillins. The compound was first described by T. Kato (J. Antibiotics, Series A, 6, 130, 184 1953), and subsequently by S. Murao (J. Agric. Chem. Soc. Japan, 29, 400–07, June 1955). The latter author produced the compound by permitting penicillanamidase from *Penicillium chrysogenum* Q 176 to act upon the sodium salt of penicillin G. In this reaction phenylacetic acid was split off. The strain of *Penicillium chrysogenum* Q 176 was caused to secrete penicillinamidase by pretreatment with sulfathiazole. This procedure is difficult to carry out, however, and does not make it possible to obtain relatively large amounts of 6-aminopenicillanic acid.

A further synthesis for the production of 6-aminopenicillanic acid is described in Belgian Patent No. 569,728, whereby *Penicillium chrysogenum* is grown in the usual media under conventional conditions, except that the precursor, such as phenylacetic acid or phenoxyacetic acid is omitted. It is, however, technically very difficult to separate and recover the desired product, such that the process is hardly suitable for commercial operations.

The present invention is based upon our discovery that 6-aminopenicillanic acid can be obtained in very good yields and without great technical difficulties by permitting certain bacterial extracts, enzymes or enriched enzyme extracts obtained from the bacterial extracts to act upon penicillins. For example, extracts of gram-negative bacteria such as *E. coli, Bact. proteus,* and *Aerobacter aerogenes,* have been found to be particularly suitable for use in our process. This is relatively surprising inasmuch as it is known that *E. coli,* for example, is capable of forming penicillinase which splits the β-lactam ring in the penicillin molecule.

For best results, the process of the invention is carried out by causing suspensions of the bacteria or of mutants of the bacteria to act upon penicillins in the presence of toluene, chloroform or other preserving agents customarily employed in working with enzymes. Preferably, the penicillins are employed in concentrations of from 5,000–10,000 units or more per cubic centimeter. Depending upon the specific bacteria employed, the process is effected at temperatures within the range of from 0—50° C., and preferably between 20 and 40° C., with 37° C. representing the optimum operating temperature under most circumstances. It is preferred to conduct the process at pH values within the range of from 5 to 9, and preferably at values between 6.5 and 8.0. The reaction time is dependent upon the amount of penicillin and enzyme employed and may range from 15 minutes to 24 hours. Most desirably, the quantity of reactants is selected such as to provide a reaction time of about 5 hours. Under these conditions, it is found that the penicillins are transformed quantitatively into 6-aminopenicillanic acid.

With respect to the selection of suitable bacteria for use in the biochemical synthesis of our invention, it is interesting to note that the desired penicillin cleavage is generally effected efficiently in the presence of a bacterium species or not at all. For this reason, it is not practical to define the operative bacterial strains precisely by reference to genera of related microorganisms, but rather, it is recommended that the selection be made by suitable testing of each species. In this connection, the following testing procedure serves admirably for purposse of determining the ability of microorganisms to form 6-aminopenicillanic acid by reaction with penicillins.

To approximately 10 cubic centimeters of a phosphate buffer solution (pH 7.0) containing 10,000 international units of penicillin G per cubic centimeter, an equal volume of a test bacterial suspension in a phosphate buffer solution (pH 7) is added, and, after adding 0.2 percent of toluene, the preparation is stored for 5 hours at approximately 37° C. The suspension of the bacteria is prepared by inoculating 100 cubic centimeters of a suitable nutrient broth with a pure culture of the bacterium to be tested, and cultivating the mixture on the shaking machine for about 18 hours at 28–32° C. Thereafter, the bacteria are separated by centrifugation, washed in 40 cubic centimeters of a phosphate buffer solution (pH 7), and resuspended in 10 cubic centimeters of the phosphate buffer solution at pH 7.

Following the 5-hour action of the bacterial cells on the penicillin G, the residual penicillin content is microbiologically determined in the centrifuged solution free from cells. With various bacterial strains the following results are obtained in this test:

(1) The solution may retain its full initial activity. In this case, it may be said that the bacterial cells under test did not develop any enzymatic action as against penicillin G and, hence, the bacteria are unsuitable for use in the preparation of penicillin-splitting enzymes.

(2) The solution may be found to be inactive or possessed of a greatly reduced activity. In this case, 500 milligrams of phenylacetyl chloride are then caused to act upon the solution with ice cooling and simultaneous addition of sodium bicarbonate. The solution is then tested again, with the following possible results being observed:

(a) No increase in activity as against the non-acylated solution, indicating that the penicillin was degraded irreversibly by penicillinase or similar enzymes developed during the reaction;

(b) A full reactivation of the penicillin action up to 10,000 international units per cubic centimeter of the solution, indicating that the penicillin G was cleaved by enzymatic action in such a way that 6-aminopenicillanic acid and phenylacetic acid are formed. The bacteria functioning in this manner are, of course, eminently suitable for use in the enzymatic formation of 6-aminopenicillanic acid by the process of the invention;

(c) A partial reactivation of the original penicillin activity of 10,000 international units per cubic centimeter of the solution occurs, indicating that penicillinase was present in the bacteria in addition to the desired enzyme by which phenylacetic acid is split-off. Bacteria exhibiting this type of activity can be employed for the preparation of 6-aminopenicillanic acid, provided the penicillanase inactivates only a negligible part of the penicillin, or if one succeeds in selectively eliminating the penicillinase activity.

The foregoing selection testing procedure can also be carried out in a modified form by investigating the enzymatic activity as against penicillin G in cell-free culture filtrates. In our application of the selection test by the procedure described in detail hereinbefore, the following microorganisms were examined as to their ability to form 6-aminopenicillanic acid from pencillin G with splitting-off of phenylacetic acid:

Bacillus subtilis
Sarcina lutea
Klebsiella pneumoniae
Streptomyces griseus
Staphylococcus aureus
Staphylococcus albus
Chromobacterium prodigiosum
Pseudomonas fluorescens
Pseudomonas pyocyaneum
Bacterium proteus OX 19
Escherichia coli ATCC 9637
Escherichia coli ATCC 11105
Escherichia coli N 14
Escherichia coli W
Escherichia coli CM 2
Escherichia coli CM 5A
Escherichia coli CM 6
Aerobacter aerogenes In the foregoing studies, it was found that *E. coli* ATCC 11105, *E. coli* ATCC 9637, and the laboratory strains of *Escherichia coli*, *E. coli* CM 2, *E. coli* CM 5A, *E. coli* CM 6 and *Aerobacter aerogenes* were all well suited for use in the process of the invention. A distinct, although slightly weaker, cleavage capacity as against penicillin G was exhibited by *Bacterium proteus* OX 19. The remaining microorganisms were unsuitable for use in the preparation of 6-aminopenicillanic acid.

In defining the operative bacteria for use in the process of the invention in terms of the foregoing test procedure, it may be said that any bacterial enzymes may be employed which are capable of inactivating penicillin G by at least 20 percent within 24 hours to yield a solution in which said inactivated penicillan G can be at least partially reactivated by the addition of phenylacetyl chloride thereto.

It is believed that the invention may be best understood by reference to the following specific examples illustrating the application of the foregoing principles and procedures to the preparation of 6-aminopenicillanic acid from typical starting materials of the general class defined.

*Example I*

A thick suspension of washed *Bacterium coli* ATCC 9637 cells was suspended in a phosphate buffer solution of pH 6. To this suspension there was added penicillin G sodium in a concentration of 5000 units per milliliter. Following the addition of 0.4 percent toluene, the solution was stored at 37° C. for 18 hours.

Seven and one-half (7.5) liters of the enzyme preparation were filled up to 30 liters with acetone. The precipitate resulting from this addition was separated by centrifugation. The solution was then concentrated in a vacuum to 3.88 liters, as a result of which a precipitate formed. After adjusting the pH to 2.6, an extraction with 2 liters of butyl acetate was effected, the extract was rejected, the aqueous phase adjusted to a pH of 4.3 by means of a sodium bicarbonate solution and, after clarifying it in a K-3-Seitz filter, the aqueous phase was concentrated under vacuum to 300 cubic centimeters, thus causing crystallization to occur spontaneously. The crystals were recovered by centrifugation, washed portionwise with 300 cubic centimeters of ice cold water and 150 cubic centimeters of acetone. From the mother liquor, an additional, slightly less pure fraction of 6-aminopenicillanic acid can be recovered. The melting point of the product is 203° C. with decomposition. The ninhydrin test with a dilute aqueous solution shows orange to reddish-brown coloration.

The determination of 6-aminopenicillanic acid is best effected by testing the solution recovered after storage without further treatment against one of the conventional penicillan-sensitive organisms. In this experiment, 6-aminopenicillanic acid itself exhibits extremely low bacteriostatic activity. A second sample of 6-aminopenicillanic acid is treated carefully in the presence of ice cooling with an excess of phenylacetyl chloride and sodium bicarbonate. This causes phenyl-acetylation of the free amino group, and an amount of penicillin G is obtained which corresponds to the quantity originally present.

*Example II*

A dense suspension of *Escherichia coli* ATCC 11105 cells in a phosphate buffer solution of pH 7.5 was adjusted to a pH of 8.5 by means of a sodium carbonate solution. Upon the addition of 1 mg. percent of Lysozyme, 0.05 percent of sodium desoxycholate, 0.01 mole of sodium ethylene diamine tetraacetate and 0.4 percent of toluene, this suspension was held at 37° C. for 2 hours in order to bring about lysis of the bacterial cells. Thereupon, the pH of the preparation was brought back to pH 7.5 by HCl, and the residual cells not affected by lysis and other insoluble residues were separated by centrifugation. The supernatant, liquid extract was treated with potassium penicillin G up to a concentration of 15,000 units per cubic centimeter and, after the addition of 0.4 percent toluene, it was held for 12 hours at 30° C.

In order to effect isolation of the 6-aminopenicillanic acid formed, an equal volume of acetone was added to the reaction mixture and it was stirred vigorously for a short period of time. The precipitate formed was separated. For extraction of the acetone, the liquid filtrate was shaken with an equal volume of butyl acetate. The separated, aqueous phase was next adjusted to pH 2.8 with HCl at 0° C. for the removal of the non-split penicillin, and shaken with an equal volume of cooled butyl acetate. The aqueous phase was separated, adjusted with KOH to pH 4.3, and evaporated in a vacuum at 20-25° C. There was thus formed a white, crystalline precipitate of 6-aminopenicillanic acid which was separated from the mother liquor, repeatedly washed with acetone, and dried in a vacuum. The crystals of 6-aminopenicillanic acid thus obtained melt at 203–205° C. with decomposition. They exert practically no antibiotic action as against *Bacillus subtilis*. After its reaction with phenylacetyl chloride there resulted an action of 2660 international units per milligram of 6-aminopenicillanic acid present. Ninhydrin test: orange to brownish-red reaction.

*Example III*

A dense suspension of *Bacterium proteus* OX 19 cells in a phosphate buffer solution (pH 7.0) was acted upon with sodium penicillin G up to a concentration of 5000 units per cubic centimeter. Following the addition of 0.2 percent of chloroform, the solution was held for 15 hours at 37° C. From the resulting solution, 6-aminopenicillanic acid was isolated by the procedure described in Example II.

*Example IV*

To a dense suspension of the washed cells of the strain *Escherichia coli* CM 2 in a phosphate buffer solution of pH 7.5, sodium penicillin G was added in a concentration up to 10,000 international units per cubic centimeter. Following the addition of 0.0005 percent of 2.4 dinitrophenol serving as a preservative, the solution was stored for 9 hours at 37° C. From the resulting solution, 6-aminopenicillanic acid was isolated by the technique described in Example I.

*Example V*

To a dense suspension of the washed cells of the strain *Escherichia coli* CM 5A in a phosphate buffer solution of pH 7.0, sodium penicillin G was added at a concentration up to 10,000 international units per cubic centimeter. Following the addition of 0.2 percent toluene, the solution was held for 15 hours at 37° C. From the resulting solution, 6-aminopenicillanic acid was isolated by the technique described in Example I.

*Example VI*

To a dense suspension of the washed cells of the strain *Escherichia coli* CM 6 in a phosphate buffer solution of pH 7.5, sodium penicillin G was added at a concentration of 10,000 international units per cubic centimeter. Following the addition of 0.2 percent of chloroform, the solution was kept for 15 hours at 37° C. From the resulting solution, 6-aminopenicillanic acid was isolated by the technique described in Example I.

Having thus described the subject matter of our invention, what it is desired to secure by Letters Patent is:

1. A process for the production of 6-aminopenicillanic acid which comprises contacting penicillin G within an aqueous medium at a temperature within the range of 0 to 50° C., at a pH value within 5-9, for at least 15 minutes with a member of the group consisting of bacteria, bacterial extracts, enzymes and enriched enzyme extracts obtained from said bacterial extracts and recovering said 6-aminopenicillanic acid from said aqueous medium, each of said members possessing penicillin G splitting activity characterized as follows:
   (a) each member being capable of inactivating the content of penicillin G containing solutions by at least 20 percent within 24 hours; and
   (b) the content of the thus inactivated penicillin G containing solutions being capable of at least partial reactivation by the addition thereto of phenylacetyl chloride;
said characteristics (a) and (b) being determined and tested in accordance with the following procedure:
A test preparation is prepared by combining approximately 10 cubic centimeters of a phosphate buffer (pH 7.0) containing 10,000 international units of penicillin G per cubic centimeter and an equal volume of a test bacterial suspension, prepared by inoculating 100 cubic centimeters of a suitable nutrient broth with a pure culture of the bacterium to be tested and cultivating the same on a shaking machine for about 18 hours at 28° C.–32° C.; subsequently separating the bacterium by centrifugation, washing in 40 cubic centimeters of a phosphate buffer solution at pH 7.0, and 0.2 percent toluene and storing said preparation for 5 hours at approximately 37° C., after which period of time the penicillin-splitting activity of the test bacterium is determined by microbiologically determining the residual penicillin G content and if, in fact, at least 20 percent of the penicillin G is found to have been inactivated the test material is stated to have characteristic (a);

The said solution containing a member which has been found to possess characteristic (a) is then contacted with 500 milligrams of phenylacetyl chloride with ice-cooling while simultaneously adding sodium bicarbonate thereto and microbiologically redetermining the penicillin G content thereof, and if, in fact, at least a partial reactivation of the original penicillin activity is found, the test material is stated to have characteristic (b).

2. The process of claim 1 wherein the member possessing penicillin G splitting activity is *Escherichia coli*.

3. The process of claim 1 wherein the member possessing penicillin G splitting activity is *Escherichia coli* ATCC 11105.

4. The process of claim 1 wherein the member possessing penicillin G splitting activity is *Escherichia coli* ATCC 9637.

5. The process of claim 1 wherein the member possessing penicillin G splitting activity is *Aerobacter aerogenes*.

References Cited by the Examiner

UNITED STATES PATENTS 3,127,326  3/1964  Lindner et al. _____ 195—36

OTHER REFERENCES

J. Agr. Chem. Soc. Japan, 23 pages; 411 (1950).

A. LOUIS MONACELL, *Primary Examiner.*

TOBIAS E. LEVOW, ABRAHAM H. WINKELSTEIN,
*Examiners.*

D. M. STEPHENS, *Assistant Examiner.*